United States Patent
Carolan et al.

(10) Patent No.: US 10,586,255 B2
(45) Date of Patent: Mar. 10, 2020

(54) SYSTEM AND METHOD FOR DISPLAYING ADVERTISEMENTS ON MOBILE TELEPHONE DEVICES AFTER A CALL

(71) Applicants: Gerard Carolan, County Meath (IE); Triona Mullane, Dublin (IE)

(72) Inventors: Gerard Carolan, County Meath (IE); Triona Mullane, Dublin (IE)

(73) Assignee: mAdme Technologies Limited, Dublin (IE)

(*) Notice: Subject to any disclaimer, the term of this patent is extended or adjusted under 35 U.S.C. 154(b) by 352 days.

(21) Appl. No.: 15/157,459

(22) Filed: May 18, 2016

(65) Prior Publication Data

US 2017/0243250 A1 Aug. 24, 2017

Related U.S. Application Data

(60) Provisional application No. 62/297,688, filed on Feb. 19, 2016.

(51) Int. Cl.
| | |
|---|---|
| *G06Q 30/02* | (2012.01) |
| *H04M 3/487* | (2006.01) |
| *H04M 3/42* | (2006.01) |
| *H04W 8/18* | (2009.01) |

(52) U.S. Cl.
CPC ..... *G06Q 30/0267* (2013.01); *G06Q 30/0269* (2013.01); *H04M 3/4211* (2013.01); *H04M 3/42102* (2013.01); *H04M 3/4878* (2013.01); *H04W 8/18* (2013.01); *H04M 2201/18* (2013.01); *H04M 2203/351* (2013.01)

(58) Field of Classification Search
CPC .................................................. G06Q 30/02
See application file for complete search history.

(56) References Cited

U.S. PATENT DOCUMENTS

| | | |
|---|---|---|
| 2001/0054000 A1 | 12/2001 | Parus et al. |
| 2005/0010573 A1 | 1/2005 | Garg |

(Continued)

FOREIGN PATENT DOCUMENTS

| | | |
|---|---|---|
| CA | 2934570 A1 | 5/2015 |

OTHER PUBLICATIONS

European Search Report for Application No. 16187674.9, dated Jun. 21, 2017, 10 pages.

(Continued)

*Primary Examiner* — Vincent M Cao
(74) *Attorney, Agent, or Firm* — The Marbury Law Group, PLLC

(57) ABSTRACT

Methods, systems, and devices for displaying advertisements on mobile telephone devices at the end of a call to a pre-designated number are disclosed. In aspect a computerized method comprises determining that a telephone call has been initiated between a mobile telephone device and a second telephone device, determining that the telephone number matches a campaign telephone number stored on the mobile telephone device, determining a media object to display based on the telephone number, downloading the media object on the mobile telephone device, determining that the telephone call has ended, and displaying the media object on the mobile telephone device after the telephone call has ended.

15 Claims, 9 Drawing Sheets

(56) References Cited

U.S. PATENT DOCUMENTS

| | | | |
|---|---|---|---|
| 2006/0109969 A1* | 5/2006 | Oh | H04M 3/42017 379/207.16 |
| 2007/0116227 A1* | 5/2007 | Vitenson | H04M 3/4878 379/207.02 |
| 2007/0244752 A1* | 10/2007 | Bayne | G06Q 30/02 705/14.61 |
| 2008/0132209 A1 | 6/2008 | Willey | |
| 2008/0189177 A1* | 8/2008 | Anderton | G06Q 30/02 705/14.26 |
| 2009/0070210 A1* | 3/2009 | White | G06Q 30/00 705/14.73 |
| 2009/0171749 A1 | 7/2009 | Laruelle et al. | |
| 2009/0313097 A1* | 12/2009 | Chatterjee | G06Q 30/02 705/14.1 |
| 2010/0063989 A1 | 3/2010 | Mehta et al. | |
| 2010/0125500 A1 | 5/2010 | Beavers et al. | |
| 2010/0158230 A1* | 6/2010 | Dhawan | H04M 1/2478 379/201.02 |
| 2012/0036021 A1 | 2/2012 | Huddleston | |
| 2013/0054379 A1* | 2/2013 | Seo | G06Q 30/02 705/14.69 |
| 2013/0151343 A1 | 6/2013 | Phan | |
| 2013/0166594 A1 | 6/2013 | Vance et al. | |
| 2013/0304789 A1 | 11/2013 | Herlein et al. | |
| 2015/0103992 A1* | 4/2015 | Caspari | H04M 3/56 379/202.01 |
| 2015/0120442 A1 | 4/2015 | Ganesh et al. | |
| 2015/0170184 A1* | 6/2015 | Kim | G06Q 30/0226 705/14.27 |
| 2015/0213490 A1 | 7/2015 | Oikonomidis | |
| 2015/0350186 A1* | 12/2015 | Chan | H04L 63/083 726/9 |
| 2016/0343034 A1* | 11/2016 | Green | H04M 3/42059 |

OTHER PUBLICATIONS

International Search Report and Written Opinion for Application No. PCT/US2016/068466, dated Mar. 22, 2017, 2 pages.

* cited by examiner

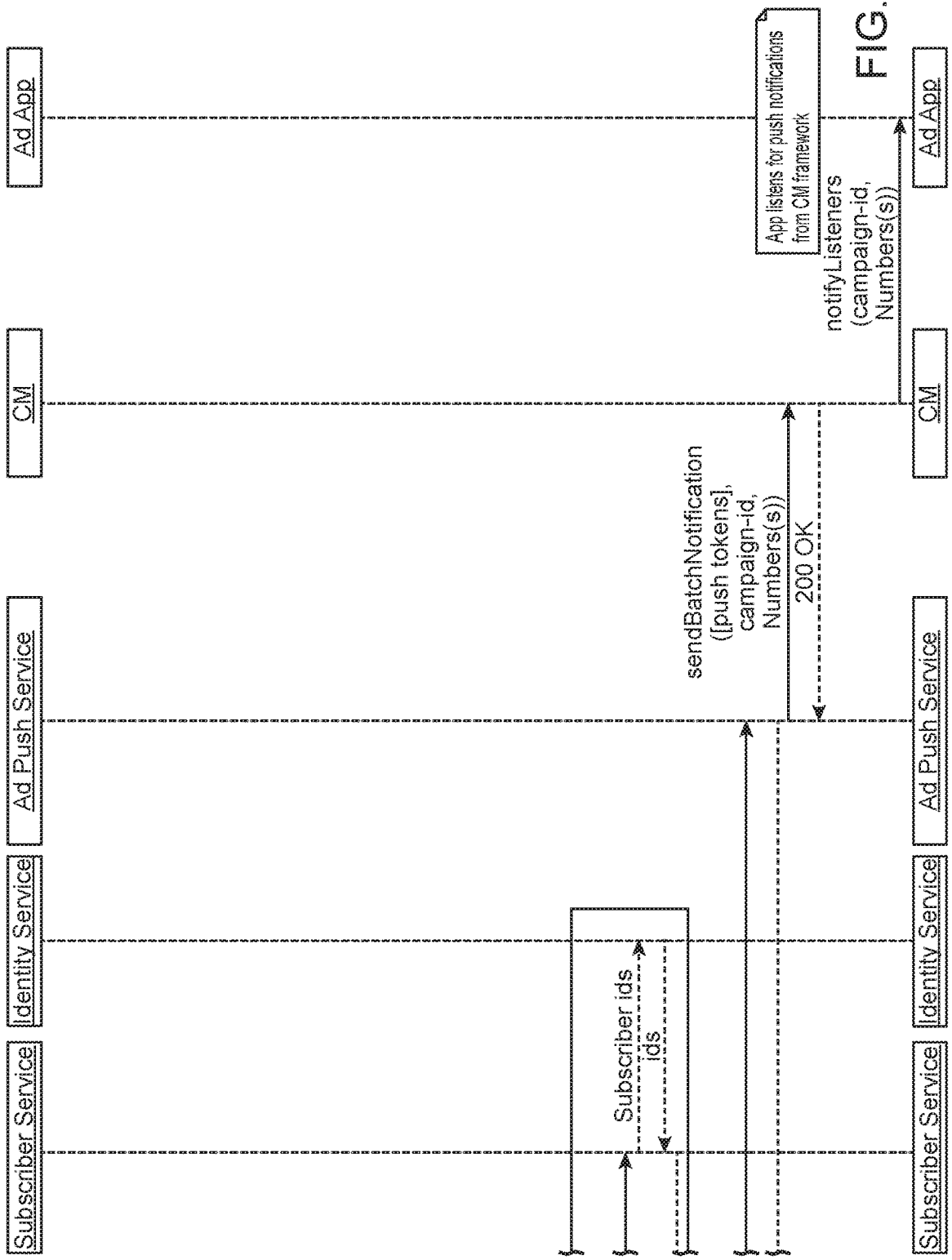

SYSTEM AND METHOD FOR DISPLAYING ADVERTISEMENTS ON MOBILE TELEPHONE DEVICES AFTER A CALL

CROSS-REFERENCES TO RELATED APPLICATIONS

This application claims the benefit and priority of U.S. Provisional Application No. 62/297,688, entitled "SYSTEM AND METHOD FOR DISPLAYING ADVERTISEMENTS ON MOBILE DEVICES AFTER A CALL", filed on Feb. 19, 2016, the full disclosure of the above referenced application is incorporated herein by reference.

BACKGROUND

The present disclosure generally relates to mobile telephony systems and software therefor, and in particular a system for displaying directed advertisements in a mobile telephone network.

Advertising on mobile devices, such as smartphones, is increasingly used by advertisers to reach a wide audience of consumers. One advantage of mobile advertising over traditional advertising is that the mobile advertisements on smartphones may be narrowly tailored to the users of the smartphones. For example, mobile advertising networks such as AdMob for Android platform or iAds for iOS platform may use a targeting algorithm to select mobile ads deemed to be of interest to smartphone users based on information known about the users. Leveraging user information for targeted mobile advertising enables the advertisers to reach consumers as efficiently as possible. Users benefit by being able to view ads that are of their interest. Developers of mobile applications commonly use mobile ads to monetize the apps.

US Patent Publication No. 20150120442 is directed toward targeted mobile advertising directed at users of multiple subscriber identity modules (SIM) in a telephone. The method disclosed directs advertisements to the user's mobile phone based on whether the SIM is used for work or personal communication. US Patent Publication No. US 20130151343 to Phan introduces a method of monitoring physical activity of a telephone user via sensors on the telephone, to target advertisements.

However, currently no mechanism/technology exists where a company can use their own telephone number(s) and at the end of an incoming call display relevant content to the user when the call ends.

SUMMARY OF THE INVENTION

In one aspect, the present application discloses methods, systems, and devices for displaying media on a mobile telephone device. In one embodiment the method comprises determining by a mobile telephone device that a telephone call has been initiated between the mobile telephone device and a second telephone device, determining by the mobile telephone device a telephone number of the second telephone device, determining by the mobile telephone device that the telephone number of the second telephone device matches a campaign telephone number stored on the mobile telephone device, determining a media object to display based on the telephone number, downloading the media object on the mobile telephone device, determining by the mobile telephone device that the telephone call has ended, displaying the media object on the mobile telephone device after the telephone call has ended. The media object may be an advertisement. In an embodiment, the telephone call is an outgoing call by the mobile telephone device. The media object may further be determined based on an identity associated with the mobile telephone device. In one embodiment, the media object is downloaded during the call. In another embodiment, the media object is downloaded after the call. A list of campaign telephone numbers may be received by the mobile telephone device from a server computing device before the telephone call is initiated. The list of campaign telephone numbers may then be stored on the mobile telephone computing device.

In another embodiment, the method comprises determining by a mobile telephone device that a telephone call has been initiated between the mobile telephone device and a second telephone device, determining by the mobile telephone device a telephone number of the second telephone device, delivering by a mobile telephone device the telephone number of the second telephone device to a server computing device, determining a media object to display based on the telephone number, downloading the media object on the mobile telephone device, determining by the mobile telephone device that the telephone call has ended, and displaying the media object on the mobile telephone device after the telephone call has ended. The media object may be an advertisement. In an embodiment, the telephone call is an outgoing call by the mobile telephone device. The media object may further be determined based on an identity associated with the mobile telephone device. In one embodiment, the media object is downloaded during the call. In another embodiment, the media object is downloaded after the call.

In another aspect, the present application discloses methods, systems, and devices for delivering media to a mobile telephone device. In an embodiment, the method comprises sending a notification from a server computing device to a mobile telephone device, receiving by the server computing device a call to download a media object from the mobile computing device after a telephone call is initiated between the mobile telephone device and a second telephone device having a telephone number from the list of campaign telephone numbers, determining that the mobile telephone device is eligible to receive the media object, and delivering the media object to the mobile telephone device. The notification may comprise a campaign ID and a list of campaign telephone numbers. The media object is displayed on the mobile telephone device after the telephone call is terminated. The media object may be an advertisement. In an embodiment, the telephone call is an outgoing call by the mobile telephone device. In one embodiment, the media object is downloaded during the call. In another embodiment, the media object is downloaded after the call.

This, and further aspects of the present embodiments are set forth herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Figure 1:
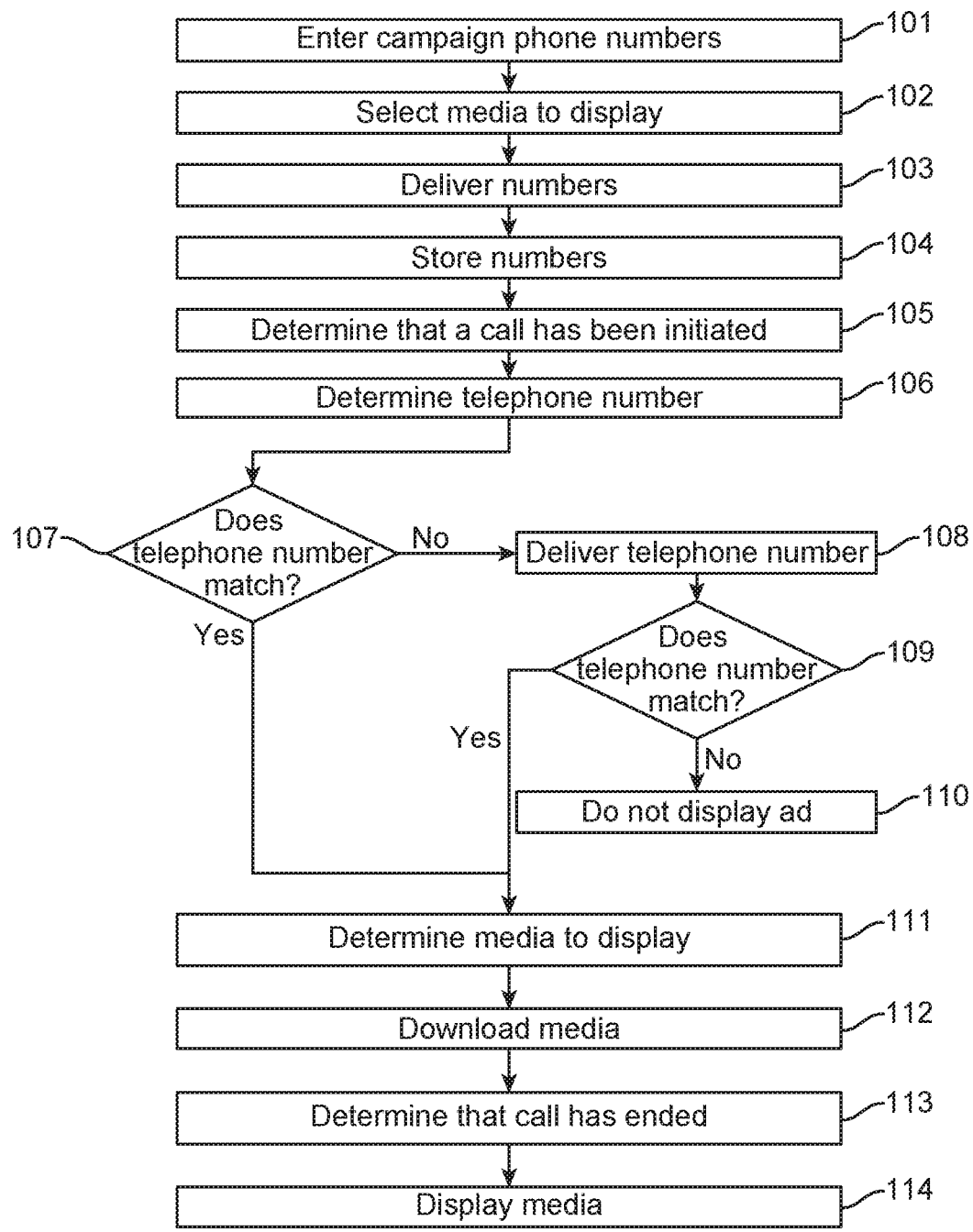
FIG. 1 shows an exemplary method for displaying advertisements on mobile telephone devices at the end of a call to a pre-designated number.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration." Any implementation described herein "exemplary" is not necessarily to be construed as advantageous over other implementations. The terms "mobile device", "cellular device", and "wireless device" may be used interchangeably and refer to any one of the various cellular telephones, smart phones, multimedia enabled cellular telephones and similar electronic devices capable of sending and receiving wireless communication signals. In an embodiment, the wireless device is a cellular handheld device (e.g., a mobile device), which can communicate via a cellular telephone communication network. The terms "app", "application", "program", and "software" may be used interchangeably and may include standalone applications, SDKs, and modules of applications or operating systems.

The present disclosure describes methods, systems, and devices for displaying advertisements on mobile telephone devices at the end of a call to a pre-designated number. In an embodiment, the system comprises software and decision engines that are configured to store one or more advertisement campaigns, a set of rules for triggering an advertisement to a caller, and to send an advertisement to a caller via a messaging service. The system may interact with the mobile user via a mobile application installed on the user's device. When a call is detected to a designated number, the system sends an advertisement to the caller's mobile telephone device based on trigger conditions at the end of the call. The system enables an advertiser to deliver targeted advertisements to a mobile user, which is mutually beneficial.

Figure 2:
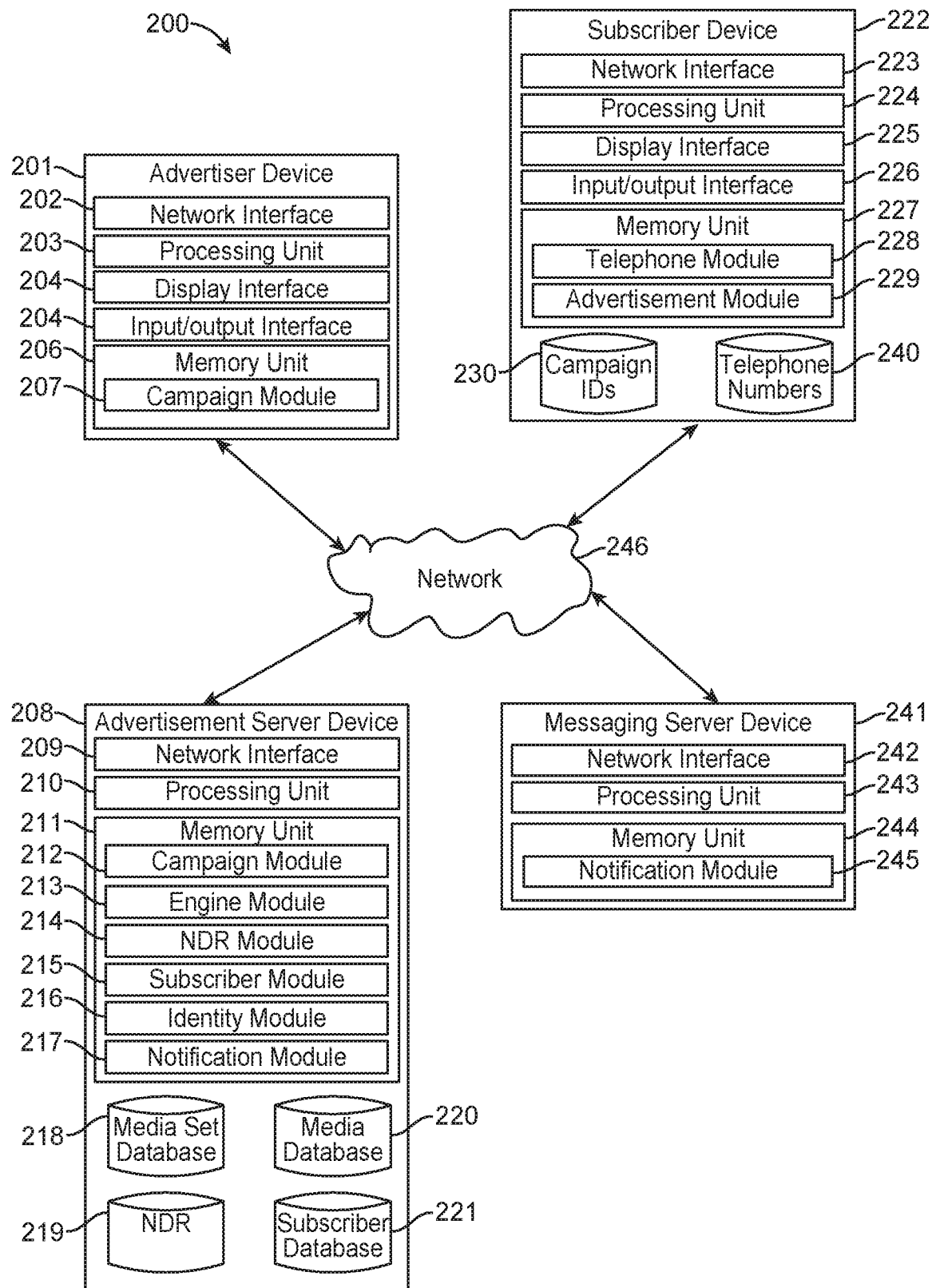
FIG. 2 shows an exemplary system architecture.

FIG. 1 shows a method for displaying advertisements on mobile telephone devices at the end of a call to a pre-designated number. A corresponding exemplary system architecture is shown in FIG. 2. At step 101 one or more telephone numbers associated with an advertisement campaign are entered on an advertiser computing device 201. The telephone numbers may then be delivered to an advertisement server computing device 208. At step 102 one or more media elements are selected on the advertiser computing device 201 to be displayed on a subscriber mobile telephone device 222 after the completion of a telephone call on the subscriber mobile telephone device 222 with one of the telephone numbers. The media elements may then be delivered to an advertisement server computing device 208.

At step 103, one or more of the telephone numbers are delivered from the advertisement server computing device 208 to one or more subscriber mobile telephone devices 222 using a message and/or a notification. In an embodiment, a separate messaging server device 241 is used to deliver the notification to the subscriber mobile telephone device 222. At step 104 the telephone numbers are stored on the subscriber mobile telephone device 222.

At step 105 the subscriber mobile telephone device 222 determines that a telephone call has been initiated. In an embodiment, the telephone call is an outgoing call initiated by the subscriber mobile telephone device. In an alternative embodiment, the telephone call may be an incoming call to the subscriber mobile telephone device. At step 107 the subscriber mobile telephone device 222 determines the telephone number of the call.

At step 107 the subscriber mobile telephone device 222 determines if the telephone number matches one of the telephone numbers stored on the mobile telephone device 222. If the telephone number matches, the system determines the media to display. In an embodiment, the media is an advertisement. At step 112 the subscriber mobile telephone device 222 downloads the media. In an embodiment, media may be streamed from the server and displayed on the mobile telephone device 222 in real-time based on network conditions.

At step 113, the subscriber mobile telephone device 222 determines that the call has ended. The media is then displayed on the subscriber mobile telephone device 222 at step 114.

If at step 107, the subscriber mobile telephone device 222 determines that the number does not match a number stored on the mobile telephone device 222, then the subscriber mobile telephone device 222 delivers the telephone number to the advertisement server device 208 at step 108. At step 109 the advertisement server device 208 determines if the telephone number matches one of the telephone numbers associated with an advertisement campaign. If the telephone number matches, the system determines the media to display. At step 112 the subscriber mobile telephone device 222 downloads the media. At step 113, the subscriber mobile telephone device 222 determines that the call has ended. The media is then displayed on the subscriber mobile telephone device 222 at step 114.

In an embodiment, if at step 109, the advertisement server device 208 determines if the telephone number does not match one of the telephone numbers associated with an advertisement campaign, then the media is not displayed. In an alternative embodiment, the system determines media to display based on the subscriber mobile telephone device 222.

FIG. 2 illustrates an exemplary system architecture according to one embodiment. The system 200 may comprise one or more advertiser computing devices 201, one or more subscriber mobile telephone devices 222, one or more advertisement server computing devices 208, and one or more messaging server computing devices 241. The computing devices 201, 222, 208, 241 are configured to communicate over the network 246.

Computing devices 201, 222, 208, 241 may comprise various components including but not limited to one or more processing units 203, 210, 224, 243, memory units 206, 211, 227, 244, video or display interfaces 204, 225, network interfaces 202, 209, 223, 242, input/output interfaces, video recording units 204 217, and buses that connect the various units and interfaces 205, 226. The network interfaces 202, 209, 223, 242 enable the computing devices 201, 222, 208, 241 to connect to the network 246 The memory units 206, 211, 227, 244 may comprise random access memory (RAM), read only memory (ROM), electronic erasable programmable read-only memory (EEPROM), and basic input/output system (BIOS). The memory units 206, 211, 227, 244 may further comprise other storage units such as non-volatile storage including magnetic disk drives, optical drives, flash memory and the like.

While FIG. 2 depicts one advertiser computing device 201, one subscriber mobile telephone device 222, one advertisement server computing device 208, one messaging server computing device 241, and one network 246, this is meant as merely exemplary. Alternatively, any number of computing devices 201, 222, 208, 241, or networks 246 may be present. Some or all of the components of the computing devices 201, 222, 208, 241 may be combined into a single component. Likewise, some or all of the components of the computing devices 201, 222, 208, 241 may be separated into distinct components connected through the network 246.

The modules of computing devices 201, 222, 208, 241 may be implemented as software code to be executed by a processing unit 203, 210, 224, 243 using any suitable computer language. The software code may be stored as a series of instructions or commands in a memory unit 206, 211, 227, 244. While specific modules are shown as part of specific computing devices 201, 222, 208, 241, modules may additionally or alternatively be integrated into any of the other computing devices 201, 222, 208, 241. Any of the described modules may be standalone applications, part of the device operating system, or incorporated into other modules or applications.

Advertiser computing device 201 may comprise a campaign module 207. Subscriber mobile telephone devices 222 may comprise a telephone module 228 and an advertisement module 220. Subscriber mobile telephone devices 222 may comprise locally stored campaign IDs 230 and telephone numbers 240.

Advertisement server computing device 208 may comprise a campaign module 212, an engine module 213, a Number Domain Registry (NDR) module 214, a subscriber module 215, an identity module 216, and a notification module 217. Advertisement server computing device 208 may comprise a media set database 218, a media database 220, an NDR repository 219, and a subscriber database 221.

System 200 may incorporate a messaging server computing device 241 configured to deliver messages to subscriber mobile telephone devices 222. Messaging server computing device 241 may comprise a notification module 245. In an embodiment, the messaging server device 241 is a separate device from the advertisement server device 208. In an alternative embodiment, the advertisement server device 208 and the messaging server device 241 may be combined into a single device.

Campaign modules 207, 212 are configured to create media campaigns. Telephone module 228 is configured to communicate with other telephone devices over a telephone network. Advertisement module 229 is configured to receive notifications and/or messages containing campaign IDs and campaign telephone numbers, store containing campaign IDs and campaign telephone numbers, determine if a called number is associated with a campaign, determine when to display an advertisement, determine which advertisement to display, retrieve advertisement media, and display the advertisement. In an embodiment, advertisement module 220 may incorporated into Telephone module 228 or any other application on the subscriber mobile telephone device 222.

Engine module 213 is configured to create and store the campaign metadata and expose an API to the subscriber mobile telephone devices 222 to request to download campaigns to the device. Number Domain Registry (NDR) module 214 is configured to store the telephone numbers used to trigger the display of an ad in the NDR 219. NDR 219 may be used as a repository for any campaigns that use telephone number triggers. NDR module 214 exposes an API to other components to allow them add/edit/lookup/delete telephone numbers on the platform. If a new campaign is created with a telephone number trigger then the engine module 213 will use the NDR API to store the phone number(s) associated with this campaign in the NDR 219.

Subscriber module 215 provides a representational state transfer (REST) API for create, read, update and delete (CRUD) operations against the subscriber database 221. Identity module 216 provides an API for authentication and authorization functions. Identity module 216 also provides API's to perform CRUD operations on subscribers. Notification modules 217, 245 are configured to send notifications or messages to subscriber mobile telephone devices 222.

Figure 3:
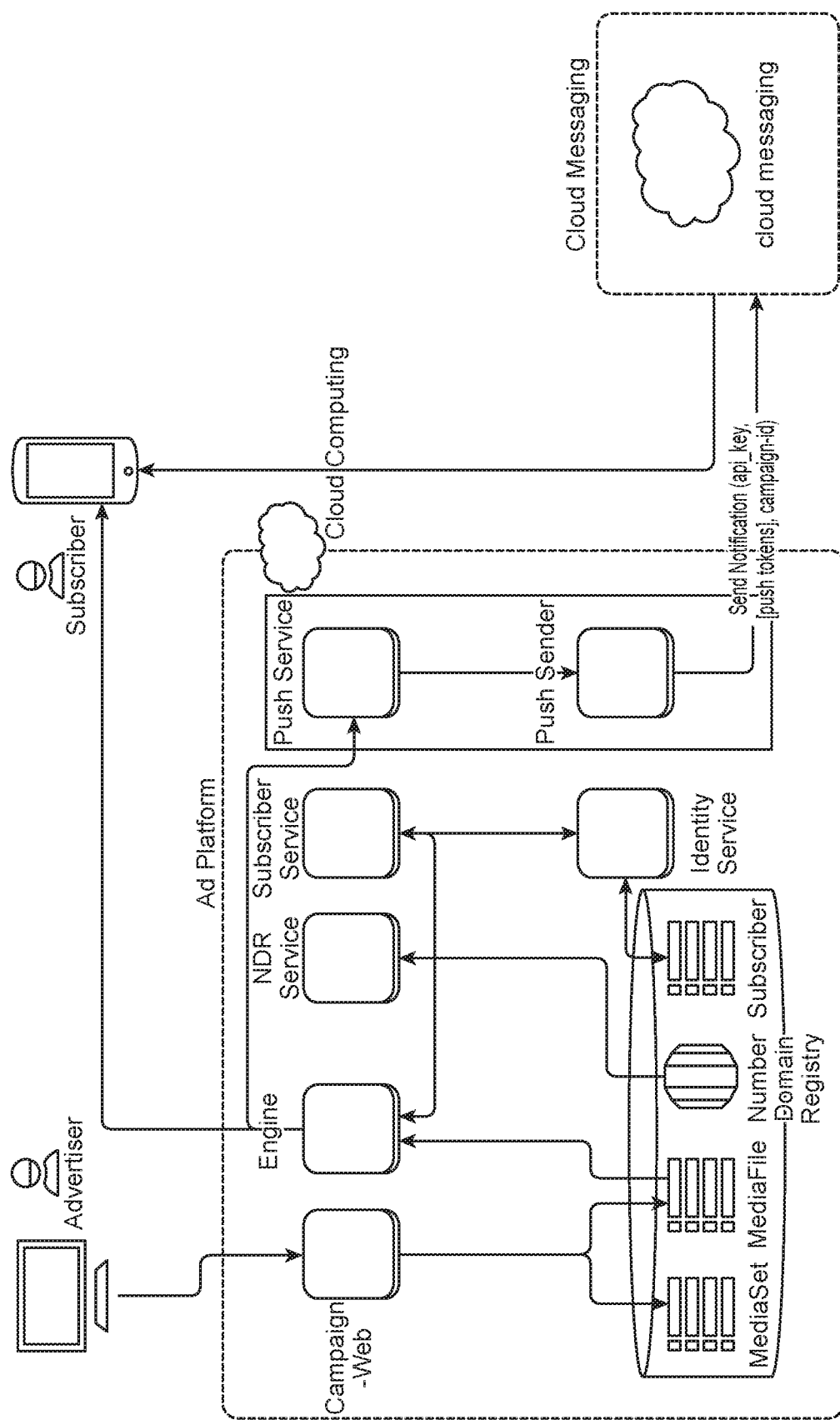
FIG. 3 shows an exemplary embodiment of a system for delivering a targeted advertisement to a mobile user at the end of a call.

FIG. 3 shows an exemplary embodiment of a system for delivering a targeted advertisement to a mobile user at the end of a call. The system comprises a campaign web portal, an engine service, a number domain registry (NDR) service, a subscriber service, a push service and a push sender.

The campaign web portal is used by advertisers to create the telephone number campaigns via a web based user interface. The campaign web portal may call a REST API to create new campaigns. The campaign web portal may also create and store media sets and media files.

The engine component is the service that creates and stores the campaign metadata and exposes an API to the clients to request to download campaigns to the device. The ad metadata is stored in several database tables. The ad media set is stored on a filesystem. The engine is configured to notify any registered devices when a new telephone number campaign is created on the portal using a cloud messaging (CM) notification. The NDR service is the component used to store the phone numbers used to trigger the display of an ad. It is used as a repository for any campaigns that use telephone number triggers. It exposes an API to other components to allow them to add/edit/lookup/delete telephone numbers on the platform. If a new campaign is created with a telephone number trigger then the engine service will use the NDR API to store the phone number(s) associated with this campaign in the NDR repository.

The Push service is used to send platform-initiated messages to clients using the cloud messaging framework. It will send batch notifications to the CM service when other platform services need to send notifications to the devices. The system further comprises an identity service that provides an API to request OAuth2 tokens for the ad service. Clients acquire a valid OAuth2 access_token from the token endpoint before making any calls to the private endpoints. The access token is sent to the server using a HTTP Authorization bearer token header. Every client is registered with the identity service. It also provides APIs to perform CRUD operations on subscribers.

The Subscriber service provides a REST API for CRUD operations against the subscriber database table. With this API the other services can lookup details about a subscriber who is provisioned on the platform. A subscriber's CM push token can be retrieved from the service in order to send notifications via CM to their mobile device. Subscriber service uses an Identity service client to call the identity service API to request information on subscribers. The client in various embodiments could be a mobile application that receives the CM notification message. The client is configured in various embodiments to display an ad to a user based on one of various triggers configured on the campaign portal when a campaign is configured. A subscriber is a mobile device user who has the ad app or ad sdk installed on their device and who has registered with the ad back end platform.

Figure 4:
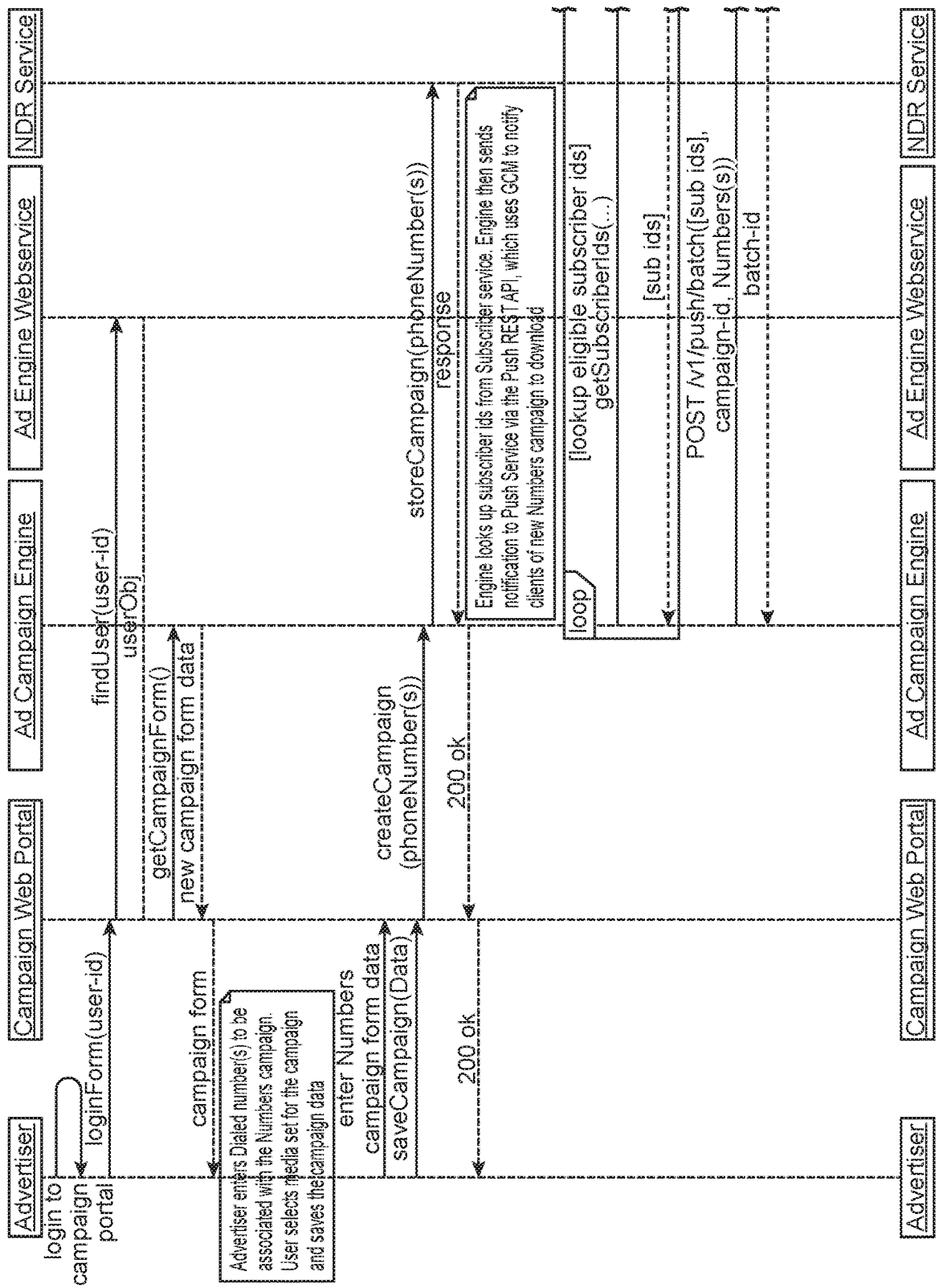
FIG. 4 shows an embodiment for a method of creating an advertisement campaign.

An embodiment for a method of creating an advertisement campaign is disclosed in FIG. 4. In one embodiment the advertiser logs into the ad campaign portal using login credentials provided to them. The advertiser selects to create a new ad campaign. The advertiser selects the ad trigger type to be a dialed number trigger as part of the ad creation. They then enter the phone number(s) to be used to trigger the campaign at the end-of-call event. They select the media to be displayed on the mobile device when the telephone number campaign is triggered. The Advertiser then saves their new campaign and the engine service takes the form data and stores this information in the database.

When the campaign is approved it will become active and is then available for clients to download. The engine service will request the subscriber IDs (subscriber-id, push token) by calling the subscriber service. The subscriber service calls the Identity service to get the IDs for each subscriber that is eligible to receive this new campaign notification. The subscriber service returns the list of IDs to the Engine service so it can create a batch push notification. The engine service then calls the push service, by posting a batch request with the subscriber IDs, campaign id, list of dialed numbers, and notification type. The Push service then creates a batch notification request to send to the CM service. The Push service then sends the batch notifications to the CM service. In an embodiment, the batch size is approximately 1000. Multiple push notifications may need to be sent to the CM service to notify all active clients of the new telephone number campaign. The CM service will forward the push notification to each device that has a push token. The ad app or ad sdk on the device will get the push notification and then using the campaign id from the notification, it will call the engine service to request to download the campaign from the server. The download may happen while the call is on-going.

Figure 5:
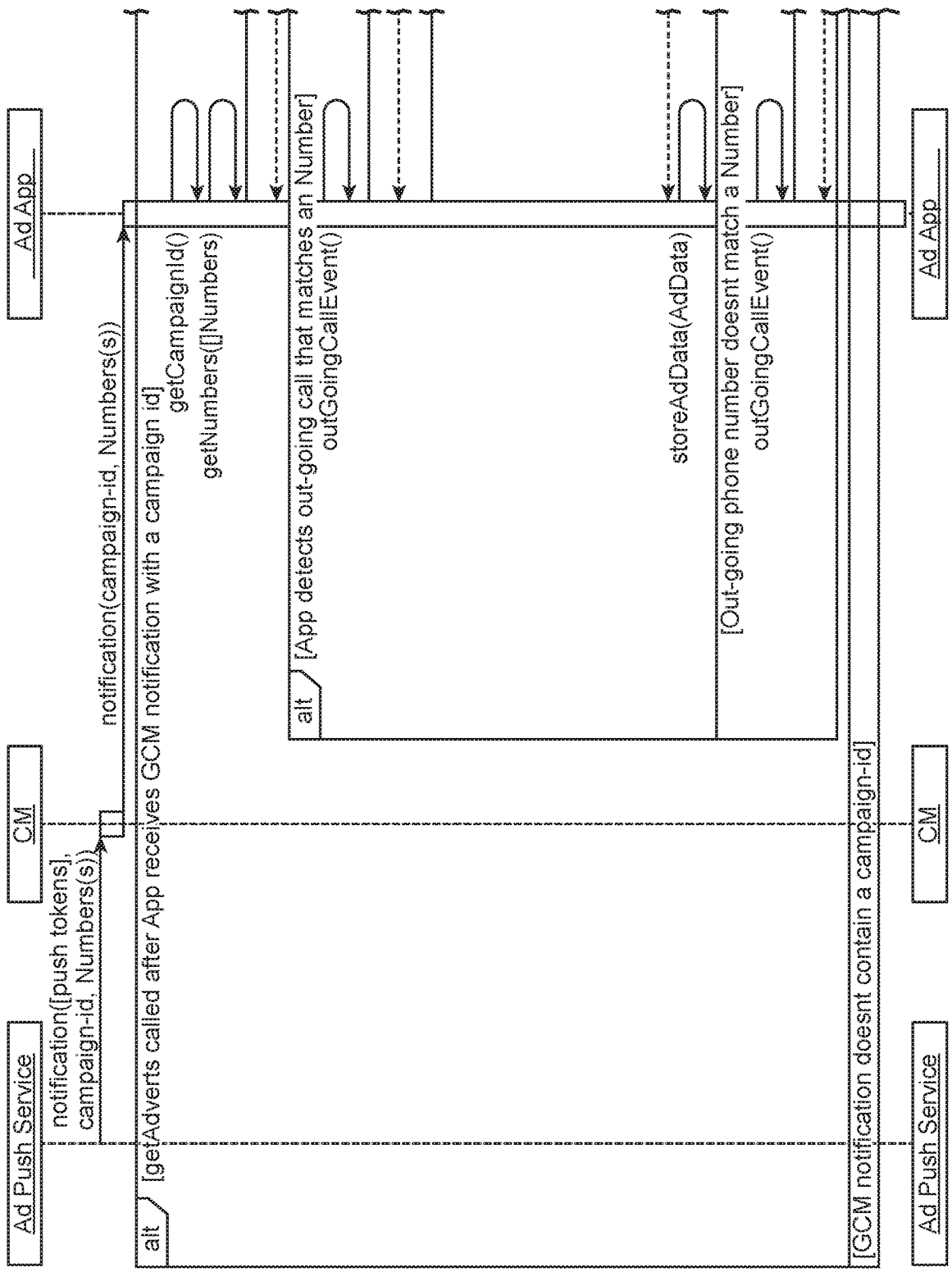
FIG. 5 shows an embodiment for a method of retrieving a telephone number campaign from a server via a cloud messaging notification.
Figure 5:
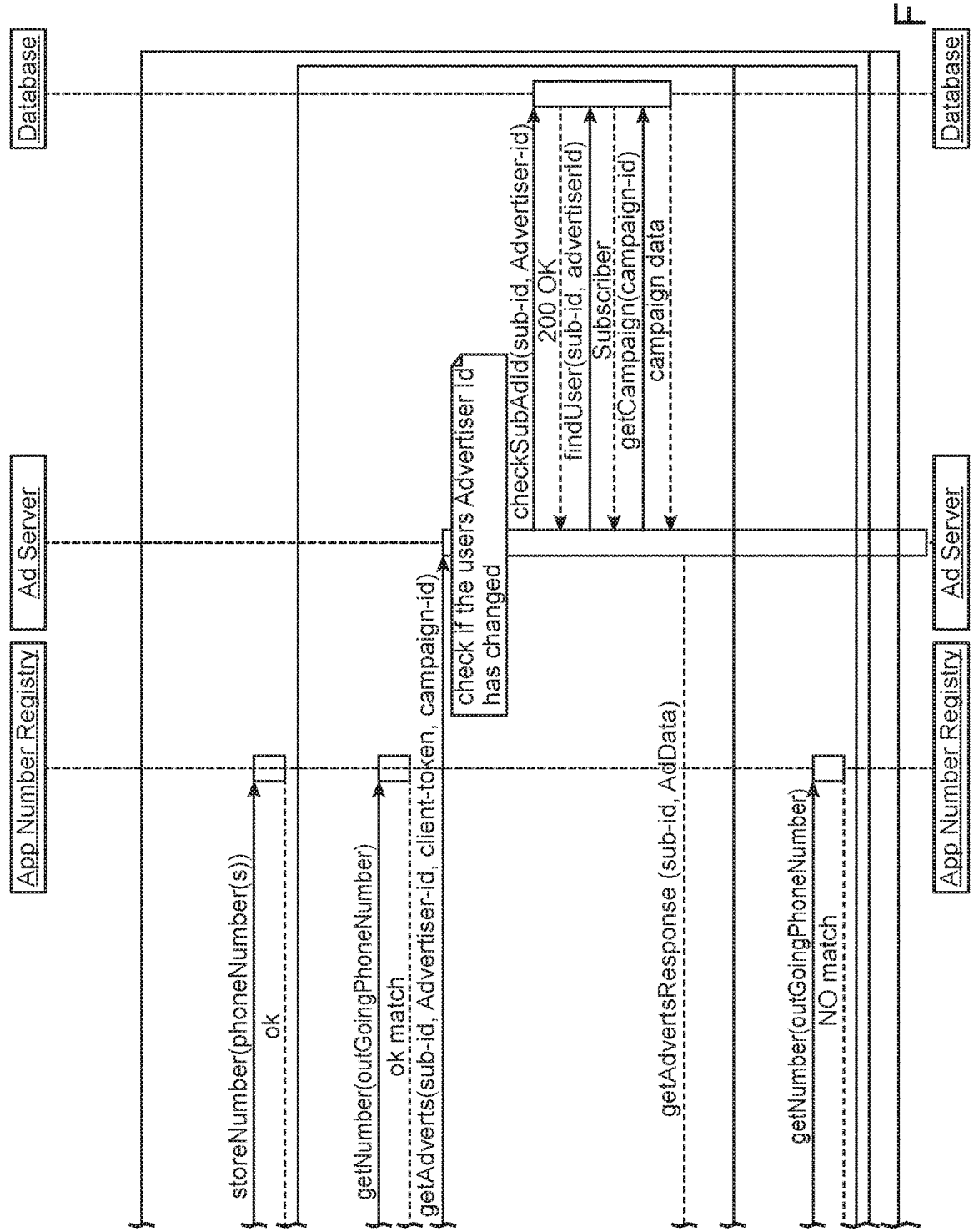

An embodiment for a method of retrieving a telephone number campaign from a server via a cloud messaging notification is illustrated in FIG. 5. The push service sends a batch notification message to the CM service with the campaign-id, list numbers of the new telephone number triggered campaign and the subscriber push tokens. The CM service sends the notification to all clients that a push token provided by the push service. The app receives the notification from the CM service and parses the campaign-id and list of numbers from the message. The app then stores the list of numbers in the number registry. The app waits for an out-going call to be made by the user and checks if the phone number matches any of the numbers stored in the number registry. If it finds a match, the app calls the server to download the Ad campaign using the Ad campaign-id from the push notification. The ad server then checks that the devices Advertiser-id hasn't changed from the last received getAdverts( ) API call to the server from this device. The Engine service looks up the user and then checks that it is eligible to receive the Ad campaign. The Engine service sends the Ad data back to the device (this may contain a URL link to the campaign media). The app then downloads the Ad media file(s) using the returned URL from the Ad metadata and stores the data into its local cache. In an embodiment, ads may be displayed in real-time based on network conditions, for example, if the client is connected to a 4G/LTE cellular network.

Figure 6:
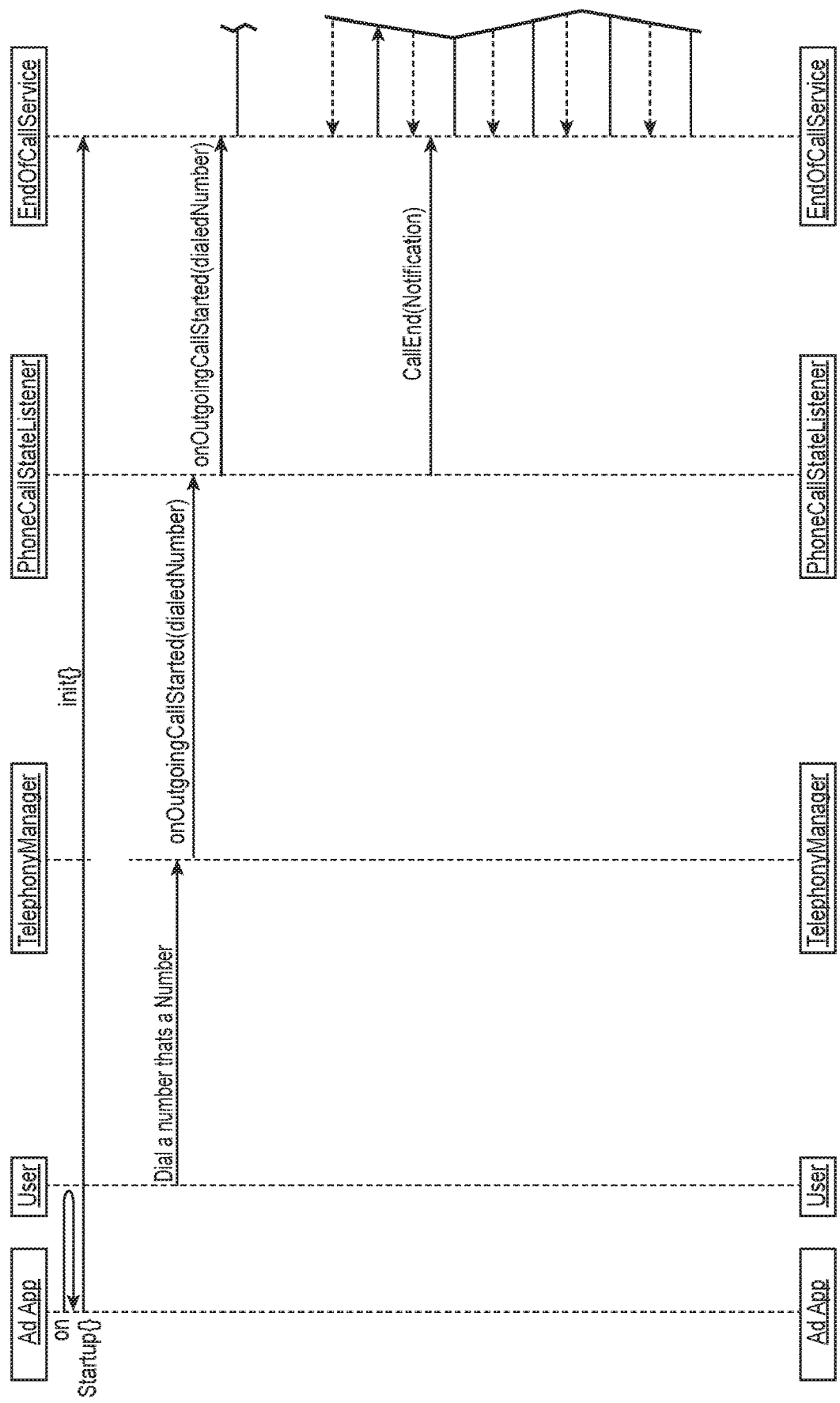
FIG. 6 shows an embodiment for a method to display an advertisement after an end-of-call event.
Figure 6:
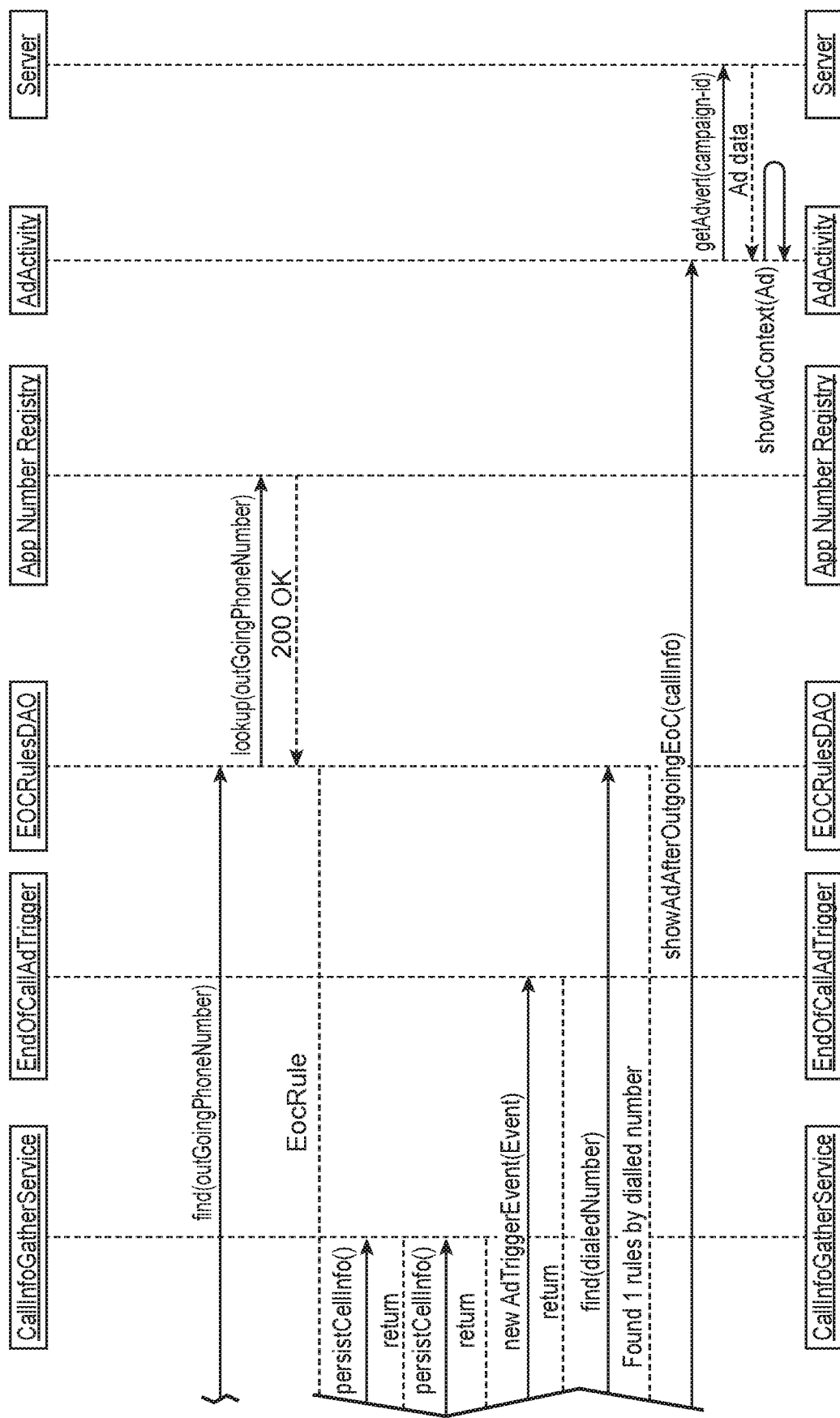

An embodiment for a method to display an advertisement after an end-of-call event is illustrated in FIG. 6. Subscriber dials a phone number on the mobile device using the Dialer application. The mobile device's TelephonyManager connects the call to the carrier's mobile network. The ad app or sdk gets a notification from the operating system (OS) that a call has begun from the device. The ad app gets the outgoing phone number from the operating system API. The app or sdk uses this retrieved phone number to check if the number exists in the applications 'app number registry' (ANR). If the phone number exists in the registry, then the app returns an EocRule object to the EndOfCall Service class. The EndOfCallService class calls the AdActivity class after detecting the call end event from the OS. The AdActivity class selects the correct Ad to display based on the telephone number trigger and ad display rules algorithm. Ad is displayed after the call terminates on the mobile device.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus or system for performing the operations herein. This apparatus or system may be specially constructed for the required purposes, and/or it may comprise a general-purpose computing device selectively activated or reconfigured by a computer program stored in a computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The various components depicted in FIGS. 2 and 3 may comprise computing devices or reside on computing devices such as servers, desktop computers, laptop computers, tablet computers, personal digital assistants (PDA), smartphones, mobile phones, smart devices, appliances, sensors, or the like. Computing devices may comprise processors, memories, network interfaces, peripheral interfaces, and the like. Some or all of the components may comprise or reside on separate computing devices. Some or all of the components depicted may comprise or reside on the same computing device.

The various components in FIGS. 2 and 3 may be configured to communicate directly or indirectly with a wireless network such as through a base station, a router, switch, or other computing devices. In an embodiment, the components may be configured to utilize various communication protocols such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), and Worldwide Interoperability for Microwave Access (WiMAX).

The components may be further configured to utilize user datagram protocol transport control protocol (TCP), satellite links and various other communication protocols, technologies, or methods. Additionally, the components may be configured to connect to an electronic network without communicating through a wireless network. The components may be configured to utilize analog telephone lines (dial-up connection), digital lines (T1,T2, T3, T4, or the like), Digital Subscriber lines (DSL), Ethernet, or the like. It is further contemplated that the components may be connected directly to a computing device through a USB port, Bluetooth, infrared (IR), Firewire port, thunderbolt port, ad-hoc wireless connection, or the like. Components may be configured to send, receive, and/or manage messages such as email, SMS, MMS, or the like.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A method for displaying media on a mobile telephone device comprising:
    registering, by a mobile telephone device, to an identity service associated with a server computing device implementing a media delivery platform;
    acquiring, by the mobile telephone device, authentication tokens through the identity service, wherein the identity service provides an application program interface (API) to the mobile telephone device for acquiring the authentication tokens;
    sending, by the mobile telephone device, the authentication tokens to the server computing device for authenticating registration with the identity service;
    receiving, at the mobile telephone device, notifications comprising information related to new campaigns to automatically update campaign telephone numbers stored in the mobile telephone device, wherein the information comprises new campaign IDs and a list of associated campaign telephone numbers used to trigger display of media objects;
    determining by the mobile telephone device that a telephone call has been initiated between the mobile telephone device and a second telephone device;
    determining by the mobile telephone device a telephone number of the second telephone device;
    determining by the mobile telephone device that the telephone number of the second telephone device matches a campaign telephone number stored on the mobile telephone device;
    determining a media object to display based on the telephone number;
    downloading the media object on the mobile telephone device;
    determining by the mobile telephone device that the telephone call has ended; and
    displaying the media object on the mobile telephone device after the telephone call has ended.

2. The method of claim 1, wherein the media object is an advertisement.

3. The method of claim 1, wherein the telephone call is an outgoing call by the mobile telephone device.

4. The method of claim 1, wherein the media object is further determined based on an identity associated with the mobile telephone device.

5. The method of claim 1, wherein the media object is downloaded during the call.

6. The method of claim 1, wherein the media object is downloaded after the call.

7. A method for displaying media on a mobile telephone device comprising:
    registering, by a mobile telephone device, to an identity service associated with a server computing device implementing a media delivery platform;
    acquiring, by the mobile telephone device, authentication tokens through the identity service, wherein the identity service provides an application program interface (API) to the mobile telephone device for acquiring the authentication tokens;
    sending, by the mobile telephone device, the authentication tokens to the server computing device for authenticating registration with the identity service;
    receiving, at the mobile telephone device, notifications comprising information related to new campaigns to automatically update campaign telephone numbers stored in the mobile telephone device, wherein the information comprises new campaign IDs and a list of associated campaign telephone numbers used to trigger display of media object;
    determining by the mobile telephone device that a telephone call has been initiated between the mobile telephone device and a second telephone device;
    determining by the mobile telephone device a telephone number of the second telephone device;
    delivering by the mobile telephone device the telephone number of the second telephone device to the server computing device;
    determining a media object to display based on the telephone number;
    downloading the media object on the mobile telephone device;
    determining by the mobile telephone device that the telephone call has ended; and
    displaying the media object on the mobile telephone device after the telephone call has ended.

8. The method of claim 7, wherein the media object is an advertisement.

9. The method of claim 7, wherein the telephone call is an outgoing call by the mobile telephone device.

10. The method of claim 7, wherein the media object is further determined based on an identity associated with the mobile telephone device.

11. The method of claim 7, wherein the media object is downloaded during the call.

12. The method of claim 7, wherein the media object is downloaded after the call.

13. The method of claim 7, further comprising:
   determining, by the server computing device, that the telephone number of the second telephone device matches a campaign telephone number.

14. The method of claim 7, further comprising determining by the mobile telephone device that the telephone number of the second telephone device does not match a campaign telephone number stored on the mobile telephone device before delivering, by the mobile telephone device, the telephone number of the second telephone device to the server computing device.

15. The method of claim 14, further comprising:
   determining, by the server computing device, that the telephone number of the second telephone device matches a campaign telephone number after delivering, by the mobile telephone device, the telephone number of the second telephone device to the server computing device.

* * * * *